United States Patent Office 3,233,888
Patented Feb. 8, 1966

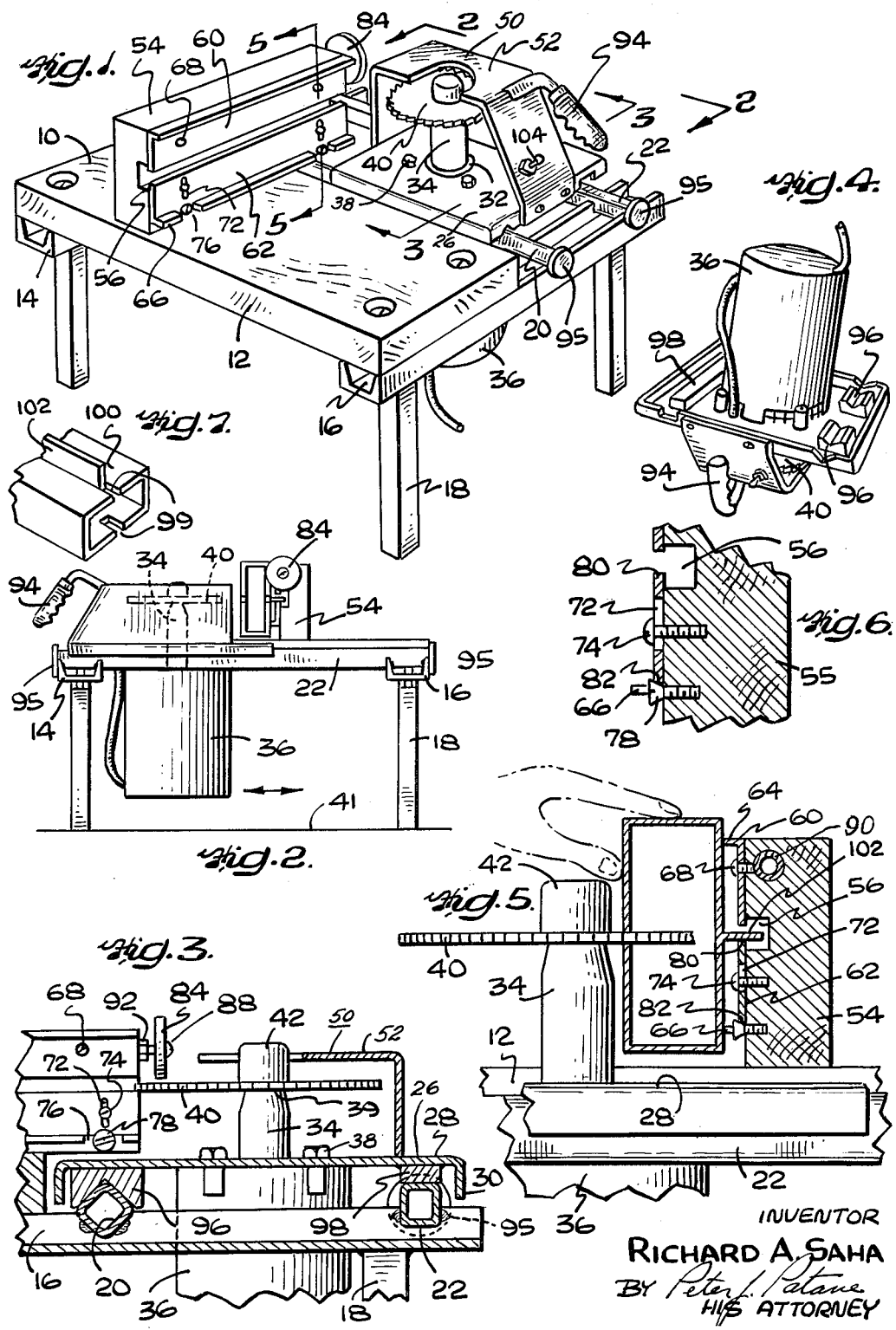

3,233,888
WORK HOLDER FOR A CIRCULAR SAW APPARATUS
Richard A. Saha, 443 W. Jefferson St., Media, Pa.
Filed Dec. 1, 1960, Ser. No. 72,898
5 Claims. (Cl. 269—319)

This invention relates to motor driven circular saw apparatus and, more particularly, to a horizontally rotatable circular saw for cutting tubes and it is an object of this invention to provide improved apparatus of this type.

As mentioned in my Patents Nos. 3,047,110 and 3,046,818, many commercial installations are being made utilizing extruded tubular aluminum members for the jambs and frames of doorways and windows, respectively. In the making of right angle connections between the tubular members, the cutting of notches is required in one of the members to accommodate the projecting ribs of the other tubular member. These notches have, heretofore, been cut either with the use of a hand saw or with a portable electrically driven motor saw. In either case, the accuracy and speed of the operation has not been as great as is desirable.

One of the objects of this invention is to provide a horizontally rotatable circular saw for notching aluminum tubes with precision and speed.

Another object of this invention is to provide an economical horizontal circular saw apparatus which is readily portable and comprises few parts.

In an embodiment of my invention a horizontally rotatable circular saw is mounted on a vertical shaft driven by an electric motor. The motor is supported by a platform through which the shaft projects and the platform is movable upon horizontal tracks. A work holder is provided to properly position the aluminum tubes with respect to the saw. The motor is sufficiently heavy to bias the platform against the tracks and to maintain the saw in proper alignment with the work holder.

The foregoing and other objects of this invention, the principles of this invention, and the best mode which I have contemplated applying such principles will more fully appear from the following description and accompanying drawings in illustration thereof.

In the drawings:

FIG. 1 is a perspective view of the horizontal circular saw apparatus constructed in accordance with my invention;

FIG. 2 is a right hand elevation view of the apparatus illustrated in FIG. 1, taken generally along the line 2—2 in FIG. 1;

FIG. 3 is a front view partly in section and partly in elevation, taken generally along the line 3—3 in FIG. 1;

FIG. 4 is a perspective view of the platform supporting the motor for the circular saw, illustrated in a position inverted from that of FIG. 1;

FIG. 5 is a view mostly in section and partly in elevation taken along the line 5—5 in FIG. 1;

FIG. 6 is an enlarged sectional view of a portion of the work support illustrated in FIG. 5; and FIG. 7 illustrates, in perspective, an example of the type of tube with which the saw may be used.

Referring to the drawings in detail, the portable circular saw apparatus 10 comprises a table 12 mounted upon two parallel channel-shaped members 14 and 16, at the back and front respectively. Depending from the channel members 14 and 16 are four spaced legs 18, one at each end of the channel members. The table may be secured to the channel members by nuts and bolts, as illustrated, the bolts being placed in holes recessed below the horizontal surface, and the legs 18 may be welded directly to the underside of the channel members. As illustrated in FIG. 1, the table 12 occupies about one half the space between the ends of the channel members.

Extending between the right-hand halves, as viewed in FIG. 1, of the channel members 14 and 16 are two horizontal, spaced tracks 20 and 22. The tracks 20 and 22 are both formed from generally square, in cross-section steel tubes, having rounded corners, the channel members 14 and 16 being notched to the right of the table 12 so that the track 20 will be partially received in V-shaped notches adjacent the table 12. The end portions of the track are disposed in the V-shaped notches and the track welded to the channel members so that the track 20 presents an inverted V-shape by its upper surfaces.

The right hand end portions of the channel members 14 and 16 are notched in the general form of a U-shape to partially receive the track 22. As illustrated, the track 22 is placed in the U-shaped notches so that one of its upper surfaces will lie horizontally.

Horizontally movable between the channel members 14 and 16 is a platform 26 comprising a generally horizontal plate 28 having depending peripheral flanges 30. Centrally located on the plate 28 is a hole 32 through which projects the vertical shaft 34 of a suitable electric motor 36. The motor 36 depends from the underside of the plate 28 and is secured thereto by suitable bolts 38 circumferentially spaced about the shaft 34. Secured against a shoulder 39 on the shaft 34 and rotatable by the shaft 34 is a circular saw 40. The motor has a length so that it clears the base or table 41 (FIG. 2) upon which one may set the entire saw apparatus 10. A collar 42 having interval threads is threaded to the external threads on the upper end (not illustrated) of the shaft 34 and forces the central portion of the circular saw to abut the shoulder 39. As illustrated in FIGS. 2 and 3, the plate 28 is wide enough so that the side peripheral flanges 30 overhang the tracks 20 and 22 but the length of the plate 28 is much shorter than the length of the tracks 20 and 22 so that the platform 26 can be moved back and forth along the tracks 20 and 22.

A housing 50, closed on three sides, is secured by its lower marginal portions to the front, rear and right hand sides, as viewed in FIG. 1, of the depending flanges of the plate 28. As illustrated, the upper surface 52 of the housing 50 has an arcuate cut out portion to accommodate the collar 42.

Mounted on a rear portion of the table 12 is a vertical work rest 54. The work rest 54 may be formed from an elongated, rectangular in cross section, block of wood and secured by screws from the underneath of the table 12. The front of the work rest 54 is provided with an elongated recess 56 into which part of the work projects, recess 56 being large enough to accept the projection.

Secured to the front of the work rest 54 are two aluminum guides 60 and 62. The upper guide 60 has an elongated upper flange 64, turned toward the work, FIG. 5. The lower guide 62 also has an elongated lower flange 66. Both the flange 64 and the flange 66 have co-planar faces against which the work abuts and which are used to align the work perpendicularly to the horizontal plane of the saw 40. The guide 60 is secured to the work rest 54 by two screws 68. The lower edge of the guide 60 extends just past the upper wall of the recess 56. The lower guide 62 has an upper edge which also extends past the lower wall of the recess 56, FIG. 5. The guide 62 is vertically movable with respect to the work rest 54 by being provided with two vertical elongated slots 72 in which are secured two screws 74 extending into and fastened to the work rest 54. The screws 74 are provided with round heads having flat undersides, as illustrated, for securely engaging the guide 62. The flange 66 has two notches 76 in which are disposed two other screws 78 having flat heads but inclined undersides, as illustrated.

The heads of the screws 74 and 78 have a thickness less than the height of the flanges 64 and 66 so that they do not interfere with the work.

The guide 62 is positioned vertically by and with respect to the holes receiving the screws 78 so that a horizontal work supporting surface 80 (FIG. 6) of the guide 62 is initially at its uppermost position at which time the edge 82 (of notches 76) rests on top parts of the inclined undersides or surfaces of the screws 78. By retracting the screws to the left, the guide 62 is allowed to move downwardly. The horizontal dimension of the flanges 64 and 66 is sufficient to permit the screws 78 to be retracted and inserted, as described, for adjusting the location of the guide surface 80 without interfering with the work.

The depth of cut which the saw 40 will make is determined by a stop which comprises a disc 84 secured to the end of a bolt 88. The bolt is externally threaded and received in an internally threaded sleeve 90 disposed in a hole in the right hand end of the work rest 54. The sleeve 90 is secured by the right hand screws 68, FIG. 5, which extends sufficiently into the work rest 54 to lock the sleeve 90. A lock nut 92 may be used also to secure the bolt 88, by tightening the nut 92 against the sleeve 90. As illustrated in FIG. 3, the disc 84 is positioned so that it is above the saw 40 and does not interfere therewith.

A handle 94 is secured to the upper front portion of the housing partially enclosing the saw 40 for moving the housing and therewith the entire platform along and upon the tracks 20 and 22.

Secured to the underside of the plate 28 are bars 96 and 98 which cooperate with the tracks 20 and 22. The bar 96 mates with the track 20 and has an inverted V-shape, in cross section, as illustrated in FIG. 3. The bar 98 mates with the track 22 and has a flat surface riding on the flat surface of the track 22. The mating relationship between the track 20 and the associated bar 96 prevents movement of the platform 28 transverse to the longitudinal axis of the tracks 20 and 22. The weight of the various parts, but primarily the weight of the motor 36, keeps the bars 96 and 98 biased downwardly against the tracks 20 and 22. If desired however, the platform 26 may be removed from the tracks 20 and 22 by moving the entire assembly to the front, to the position of FIG. 1, where it clears the work and stop 84 and lifting the entire assembly vertically upward.

As will be noted, the work rest 54, overhangs a part of the plate 28, FIG. 3. This is an advantage in that the work guide surface 80 can be brought to the peripheral edge of the saw 40 for insuring correct support for the work and for aligning the surface 80 with the bottom surface of the saw 40.

To prevent the platform 26 from overriding the tracks 20 and 22, circular discs 95 are welded to the ends of the tracks 20 and 22. The upper peripheral portions of the discs 95 engage the front or back flange of the platform 26 when the platform tends to be moved manually too far to the rear or to the front and prevents the platform from riding over the tracks. Also, if the discs 95 are omitted the motor 36 will eventually engage the channel members and prevent the platform from completely going off the tracks.

As will be noted in FIG. 5 particularly, the horizontal plane of the plate 28 is below that of the plane of the table 12 so that if work is rested on the table 12, movement of the platform 26 back and forth will not be hampered by frictional engagement with the work.

The vertical distance between the horizontal surface 80 of the guide 62 is such that the bottom of the work always clears the surface of the table 12, as best illustrated in FIG. 5. This clearance is insured by making the height of the work rest 54 and the distance of the recess 56 from the table 12 both sufficiently large to accommodate all contemplated work with clearance between the work and the table 12. Thus, any variation in the vertical dimension of the work will be allowed for and taken up in the clearance space between the bottom of the work and the table 12.

The circular saw apparatus is utilized in cutting notches 99 in aluminum tubes 100 having an upstanding central, elongated rib 102, FIG. 7. The tube 100, after being cut to proper length by other means, not illustrated, is placed against the work rest 54 and held there manually, as illustrated in FIG. 5. The tube 100 is placed so that the rib 102 rests on the horizontal surface 80, the right hand surface of the tube 100 abuts the flanges 64 and 66 (FIG. 5), and the end of the tube nearest the saw 40 abuts the disc 84.

The electric motor 36 is connected to a suitable source of power and the operator, with the other hand, then energizes the motor by turning switch 104 to the on position and moves the platform 26, by the handle 94, to the rear, until the saw 40 engages the tube 100. If a notch in only the left hand side of the tube 100 is desired, the saw 40 is stopped after it has advanced to the position illustrated in FIG. 5. If the notches illustrated in FIG. 7 are desired, which is the usual case, the travel of the platform 26 is continued to the rear until the rib 102 is notched out also. Thereafter, the platform 26 is retracted to the front and the tube 100 may be removed.

During all of the movement of the platform 26, it is noted that the motor biases the plate 28 against the tracks 20 and 22. Also, the mating V-shapes of the tracks 20 and the bars 96 prevent movement of the platform 26 transverse to the tracks 20 and 22 (which maintains the saw 40 properly aligned with the tube 100) while the bars 96 and 98 slide on the tracks 20 and 22.

As illustrated, the thickness of the circular saw 40 is equal to or slightly larger than the thickness of the rib 102.

The work rest 54 is disposed perpendicularly to the parallel tracks 20 ond 22. Consequently, the depth of cut of the circular saw 40 is the same in both the left and the right hand wall of the tube, as viewed in FIG. 5.

Having described my invention, what I claim is:

1. A work holder for a horizontally rotatable circular saw comprising the combination of a vertically extending work rest, a work support vertically movable relative to said rest, said work support having a work supporting surface for aligning said work in proper position to engage said saw, said work support being formed with an elongated slot, a screw extending through said slot for fixing said slot relative to said work rest, said slot allowing vertical movement of said work support relative to said work rest, and a second screw secured to said work rest, said second screw having an inclined surface engaging a portion of said work support for moving said work support vertically relative to said work rest as said second screw is advanced or retracted.

2. The structure recited in claim 1 and further including a stop against which the work may abut to limit the depth of cut of the saw.

3. A work holder for a horizontally rotatable circular saw comprising the combination of a vertically extending work rest, a work support, said work support having a work supporting surface for aligning said work in proper position to engage said saw, said work rest having a recess for accommodating a portion of said work, said work support comprising two spaced members defining a slot in communication with said recess, said spaced members having flanges defining aligned guide surfaces against which the work abuts.

4. The structure recited in claim 3 wherein one of the members comprising the work support is fixed to the work rest and the other has a slot by which it is vertically movable relative to said work rest and saw, a first screw extending through said slot and securing the movable member to the work rest, said first screw having a head with a thickness less than the height of the flanges, the flange of the movable member being notched to provide an edge portion, a second screw having a head with a thickness less than the height of the flanges and whose underside is tapered and engageable with said edge portion, said second screw extending into said work rest for moving the movable member vertically relative to said work rest and saw as said second screw is advanced or retracted.

5. The structure recited in claim 4 and further including a disc secured by a screw to said work rest, said disc defining an abutment transverse to the plane of the saw for limiting the depth of saw cut.

References Cited by the Examiner
UNITED STATES PATENTS

| | | | |
|---|---|---|---|
| 423,119 | 3/1890 | Breuer | 83—563 |
| 972,101 | 10/1910 | Dayton | 269—164 |
| 2,007,225 | 7/1935 | Strobel | 143—47 X |
| 2,048,629 | 7/1936 | Wallin | 269—164 |
| 2,165,313 | 7/1939 | Stevenson | 83—563 |
| 2,329,345 | 9/1943 | Gardner | 143—132.4 |
| 2,538,371 | 1/1951 | Tourneau | 143—47 X |
| 2,864,414 | 12/1958 | Mazzola | 144—136 |
| 2,887,017 | 5/1959 | Lassy | 269—304 |
| 2,905,211 | 9/1959 | Weinstein | 143—132.4 X |
| 2,951,517 | 9/1960 | Webb et al. | 143—47 X |

ROBERT C. RIORDON, *Primary Examiner.*

HUNTER C. BOURNE, JR., DAVID J. WILLIAMOWSKY, *Examiners.*